March 1, 1938.   C. E. PAGE   2,109,681
TIRE COVER
Original Filed March 6, 1931    2 Sheets-Sheet 1

INVENTOR.
Charles E. Page
BY
Ray Oberlin & Ray
ATTORNEYS

March 1, 1938.   C. E. PAGE   2,109,681
TIRE COVER
Original Filed March 6, 1931   2 Sheets-Sheet 2

INVENTOR.
Charles E. Page
BY
Fay Oberlin & Fay
ATTORNEYS.

Patented Mar. 1, 1938

2,109,681

UNITED STATES PATENT OFFICE 2,109,681

TIRE COVER

Charles E. Page, Lorain, Ohio, assignor, by mesne assignments, of part interest to Lyon Incorporated, Detroit, Mich., a corporation of Delaware Application March 6, 1931, Serial No. 520,533
Renewed April 24, 1937

2 Claims. (Cl. 150—54)

The present invention relating as nominally indicated to an improvement in tire covers, pertains more particularly to a novel form of cover which is adapted to be conveniently and readily removed or installed on automobile vehicle tires.

Heretofore tire covers, especially those of the metallic type have been made in a form similar to a "watch case type of tire mold" or the top or tread cover member has been made with a circumferential spring having a tendency to force the cover to a radius slightly less than that of the tire to be covered. The result was that such a latter type of cover was troublesome to remove and attach and due to the direction of tension in the tread cover member, a substantially complete circumferential cover of the tire was rendered impossible. These two disadvantages have been overcome by the construction embodying the principle of my invention.

Another novel feature of my invention resides in the toggle action type of latch which is provided for retention of the cover for position on the tire. Since the latch mechanism is adapted to lock at varying distances of separation of the tread cover ends, it is also possible to accommodate several different sizes of tires with one size of cover. I have also incorporated into the construction of my locking latch a means for the reception of a theft lock which was not possible in earlier forms of construction. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
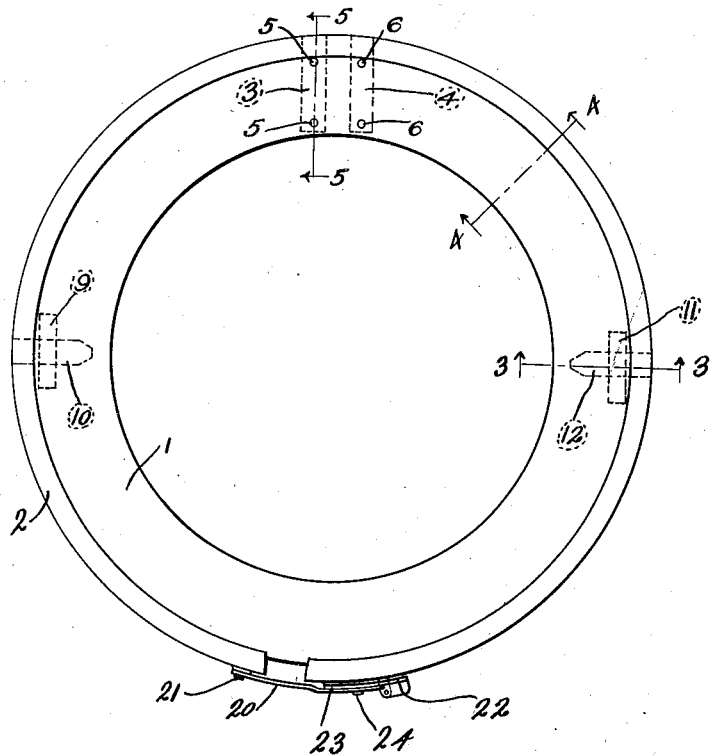
Figure 2:
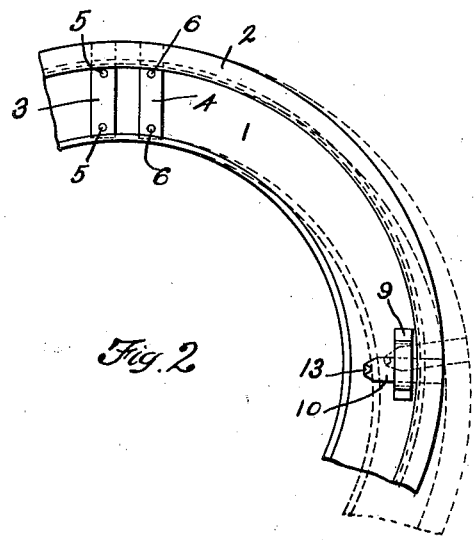
Figure 3:
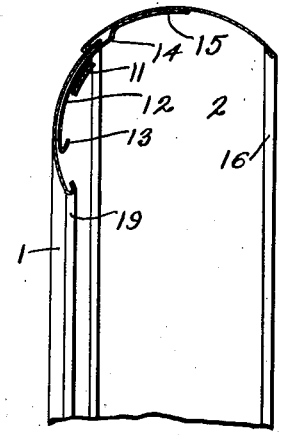
Figure 4:
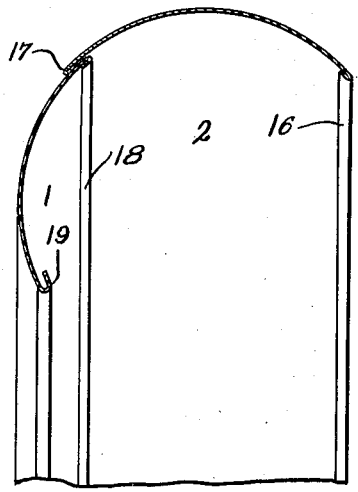
Figure 5:
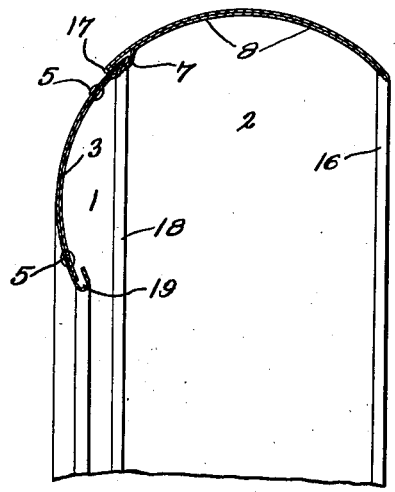
Figure 6:
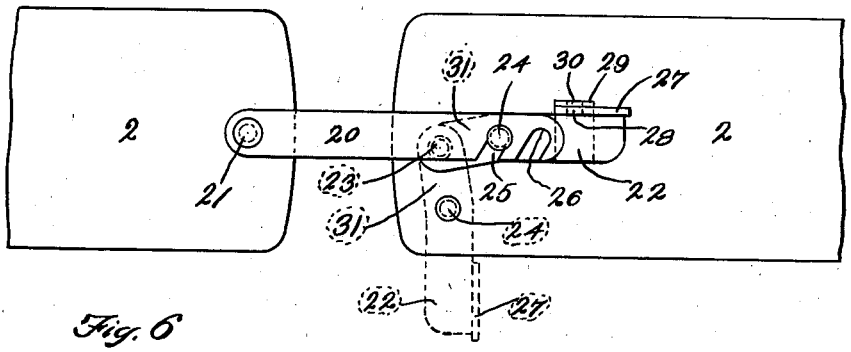
Figure 7:
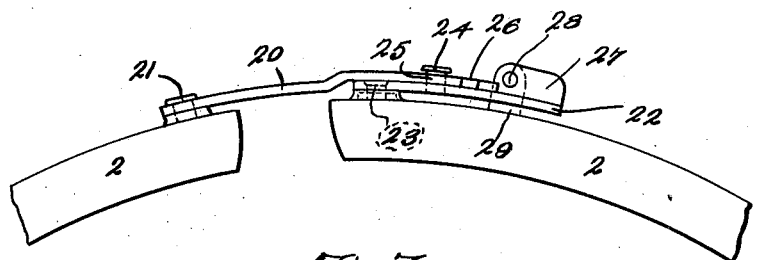

In said annexed drawings:

Fig. 1 is an elevation of the tire cover embodying the principle of my invention; Fig. 2 is a fragmentary view taken at 180° from that of Fig. 1; Fig. 3 is a section on the line 3—3 of Fig. 1; Fig. 4 is a section on line 4—4 of Fig. 1; Fig. 5 is a section on line 5—5 of Fig. 1; Figs. 6 and 7 are plan and elevational views respectively of the novel latch means employed to secure the ends of the tread cover member.

Referring more particularly to Fig. 1, the side wall cover member 1 which covers the tire throughout its circumference is secured to the tread cover member 2 by means of the transverse straps 3 and 4. These latter straps are riveted to the side wall cover 1 by suitably positioned rivets 5—5 and 6—6. As more aptly shown in Fig. 5, the straps 3 are spot welded, bolted or riveted to the tread cover along the curved portion 8. There is a transverse groove 7 placed in the securing straps 3 in order to accommodate the circumferential crimp 18 of the side wall cover 1.

The tread cover 2 is rolled or stamped in such a manner as to possess a resiliency which tends to expand it to a radius larger than that of the radius of the tire to be covered. The dotted lines in Fig. 2 show the relative positions of the tread cover when expanded and when secured on the tire.

The tongue strips 10 and 12 are welded to the tread cover 2 at points approximately 90° removed from the point of permanent attachment of the cover members 1 and 2. The tongues 10 and 12 are adapted to operably slide within the retaining sleeves 9 and 11. The hooked end 13 as best shown in Fig. 3 serves to limit the degree of expansion of the tread cover 2.

Along the peripheral edges of the side cover member 1 are the bead crimps 18 and 19. Similar crimps 16 and 17 are positioned upon the tread cover 2. Such crimps serve to impart a stiffening effect to the cover members as well as providing a suitable contacting surface along the interengaging edges of the covers 1 and 2.

In Figs. 6 and 7 there is illustrated the toggle arm form of latch which I have devised for securing the ends of the expansible tread cover 2. The link arm 20 is pivotally secured by the pin 21 to one of the transverse ends of the tread cover 2. Adapted to operably engage with the link arm 20 is the toggle arm 22 pivotally secured to the other transverse tread cover end by means of the pin 23. The engaging pin 24 positioned upon the toggle arm 22 interlocks with the notches 25 and 26 of the link arm 20. For the purposes of provision of a means for the reception of a theft lock, there is the transverse flange 27 mounted upon the toggle arm 22. The flange 27 bears against the boss 29 when the latch mechanism is in locked position. The holes 28 and 30 are then in registerable position for the reception of a suitable theft lock device.

In order to maintain the above described latch mechanism in locked position, there is provided the angularly offset portion 31 of the toggle arm 22, so that the tensional forces exerted by the link arm 20 have the tendency to retain the latch in such a locked position.

It is understood that the cover members which have just been set forth and described may be fabricated of suitable resilient material either of metal or any equivalent fibrous or plastic composition. The ornamental effect of the exterior surfaces of the cover members 1 and 2 may likewise be varied; for example, they may be enamelled or metallically plated, or decorated with a distinctive design.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A metal tire cover for spare tires comprising a side part to substantially cover the outer side wall of the tire and a tread covering part extending from said side part across the tread of the tire and provided with expansible and contractible means whereby the inner circumferential side of said tread part is brought into holding engagement with the tire, said parts including circumferentially spaced slidable connections for connecting the parts together at circumferentially spaced points, each connection including interfitting elements arranged and constructed to provide for limited movement therebetween without complete separation of said elements.

2. In a tire cover, a front cover member, a split rear cover member arranged to cooperate with the same and to clamp the front cover member to the tire when the rear cover member is contracted, said rear cover being provided with a clamping device including portions connected to the adjacent ends of the split cover member for effecting contracting of said cover, and also for permitting of the expansion of the same, said portions being adapted to be disconnected so as to get a relatively large opening of the rear cover to permit the inner edge thereof to be fitted over the rear side of the tire tread, and a plurality of connecting means between said members, each of said means including interfitting elements arranged and constructed to provide for limited movement therebetween without complete separation of said elements.

CHARLES E. PAGE.